July 30, 1940.　　　　L. L. SCHAUER　　　　2,209,938
LUBRICATING MEANS
Filed April 19, 1938　　　5 Sheets-Sheet 1
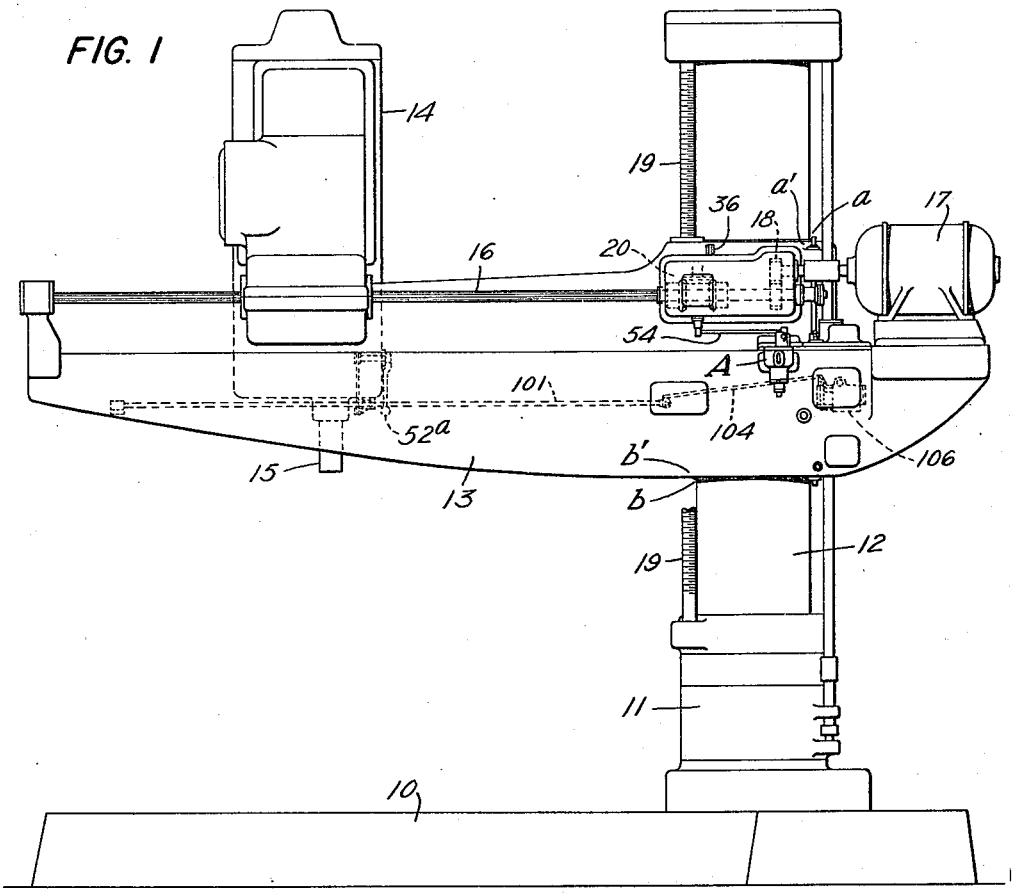

July 30, 1940.  L. L. SCHAUER  2,209,938
LUBRICATING MEANS
Filed April 19, 1938  5 Sheets-Sheet 2

INVENTOR
Lawrence L. Schauer
BY
Albert F. Nathan
ATTORNEY

July 30, 1940.　　　L. L. SCHAUER　　　2,209,938
LUBRICATING MEANS
Filed April 19, 1938　　　5 Sheets-Sheet 3

INVENTOR
Lawrence L. Schauer
BY
Albert F. Nathan
ATTORNEY

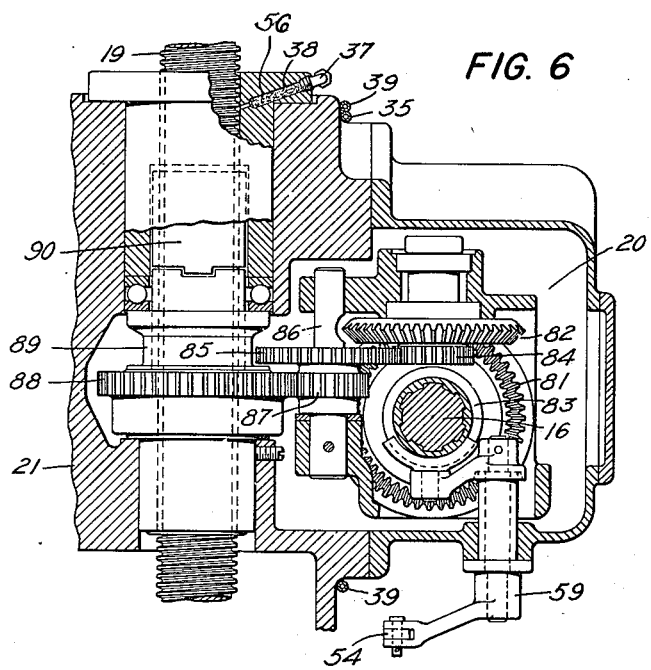
FIG. 6
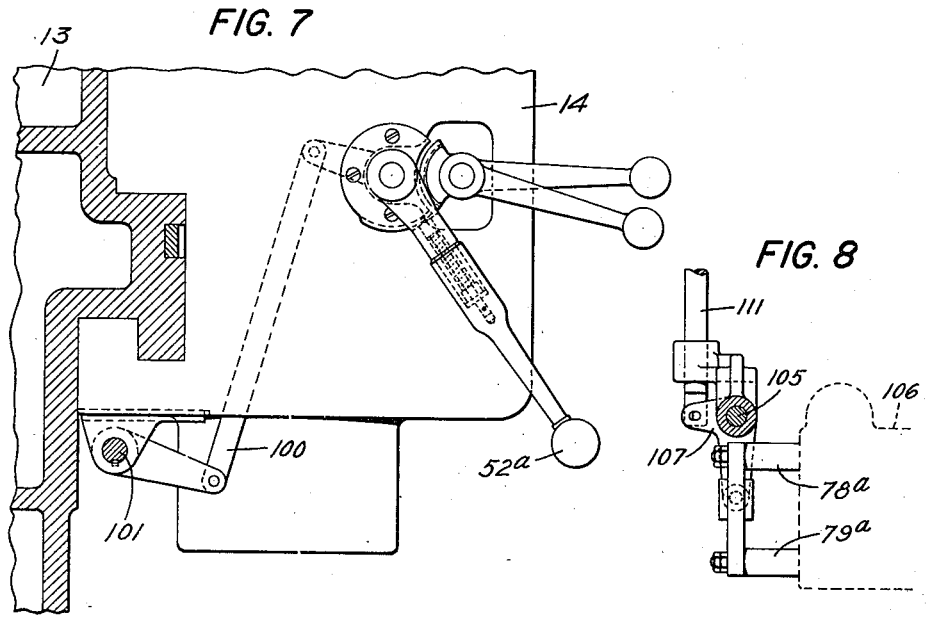
FIG. 7
FIG. 8

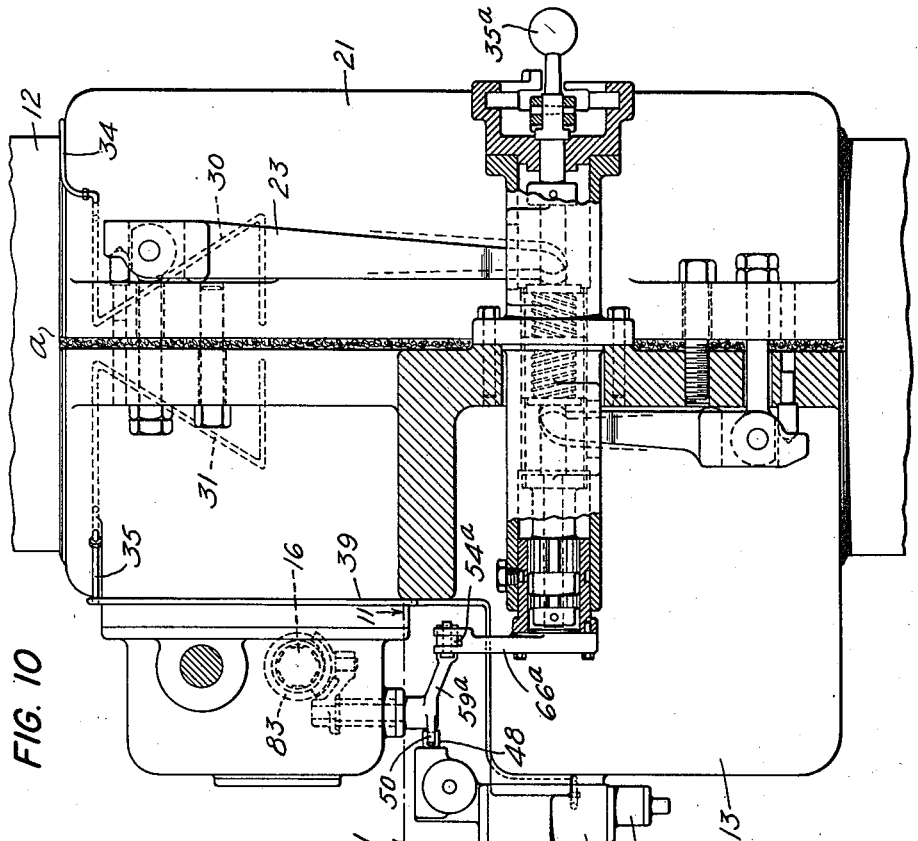
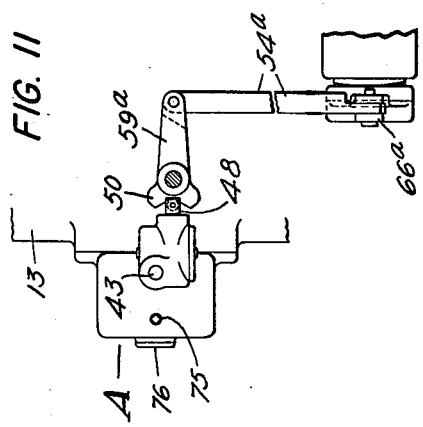

Patented July 30, 1940

2,209,938

UNITED STATES PATENT OFFICE 2,209,938

LUBRICATING MEANS

Lawrence Lee Schauer, Wyoming, Ohio, assignor to The Cincinnati Bickford Tool Company, Cincinnati, Ohio, a corporation of Ohio Application April 19, 1938, Serial No. 202,861

13 Claims. (Cl. 184—6)

The present invention relates primarily to drilling machines and particularly to an improved method and means for applying lubricant automatically and discriminately to the surfaces of relatively movable parts.

A primary aim of the invention is to definitely remove the hazard incident to infrequent, sporadic oiling of movable members particularly when such members have elevating movements and at times may occupy a position overhead. Under such conditions the lack of oiling of the parts may have disastrous consequences.

The radial drill will illustrate the problem, for here, there is a relatively long upright column upon which slides a close, accurately fitting arm girdle. Heretofore, the operator, if he thought of it, would swab the surface of the column with an oiled brush, and on the first pass of the arm it would be scraped off. When the arm was again lowered or elevated little or no oil remained. Other expedients for oiling the sleeve were also resorted to without material success.

The present invention aims to overcome the difficulties and to insure that the arm girdle is adequately lubricated whenever it is put in motion, and further, to insure that the elevating screw and nut mechanism, which brings about the motion, is copiously lubricated when performing the propelling operation.

A further object of the invention is to accomplish the lubricating act in a positive way, that is by pressure, as distinguished from gravity cups or felt rings which soon dry out, become clogged, etc., and of little use.

Still another object of the invention is to avoid undue seepage and waste of oil with a pressure lubricating system and to apply and maintain the pressure "on" only when the parts to be lubricated are in motion, and to remove the pressure when the parts stop moving and are standing idle. As an additional improvement, the invention further aims to eliminate the human element factor from the oiling operation and definitely to insure that the moving parts are adequately lubricated whenever they require lubrication.

Another object of the invention is to provide an automatic pressure lubricating system of the fewest number of parts least likely to become fouled or out-of-order, and in which one filling will last an indefinite period, and to construct the device to operate upon the principle of lubricating only when the parts are in motion, and in that event, only if a particular feed line or lines and the parts they supply, are in need of lubricant during the period the parts are in motion.

Still another object of the invention is to construct such a discriminating oiling device on the unit principle whereby it may be readily adapted to existing machines and connected to operate in the manner effectuating the aims of the invention.

In attaining the ends contemplated, it is proposed to provide a casing member within which is housed two or more pistons and a reservoir. At least one of the pistons is mechanically shifted and the other, which also performs the function of a valve, is hydraulically shifted, in opposition to a compression spring. The reservoir communicates with a central chamber between the pistons through a non-return valve. The central chamber also communicates with conduits leading to the several surfaces to be lubricated, but the point of communication with the chamber is normally closed by the valve piston. Movement of the first named piston compresses the lubricant in the central chamber between the pistons and hydraulically effects shifting of the other piston to a position opening communication with the oil conduits and then to a further position compressing the spring. The spring thereafter functions to maintain the pressure "on" in the oil lines. By so relating the operation of the first piston with the elevating mechanism and its control, the pressure oiling unit is caused to operate only when the elevating mechanism is effective. When the latter is moved to neutral or stopped position the energizing piston will be retracted thus immediately relieving the pressure in the several oil lines and the valve acting piston follows up the movement and closes off the feed lines. The pressure is, therefore, not only relieved but definitely cut off and no seepage of lubricant can occur.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a rear view of a radial drill embodying the present invention.

Fig. 6 is a vertical sectional view through the arm elevating and lowering mechanism.

Fig. 7 is a detail view of the head mounted control lever for effecting elevating and lowering operation and actuating the lubricating unit.

Fig. 8 is a detail of valve parts and connections.

Fig. 9 is a diagrammatic view of the oiling system.

Figs. 10 and 11 are views of a variant form of actuator for the lubricating unit.

Figure 3:
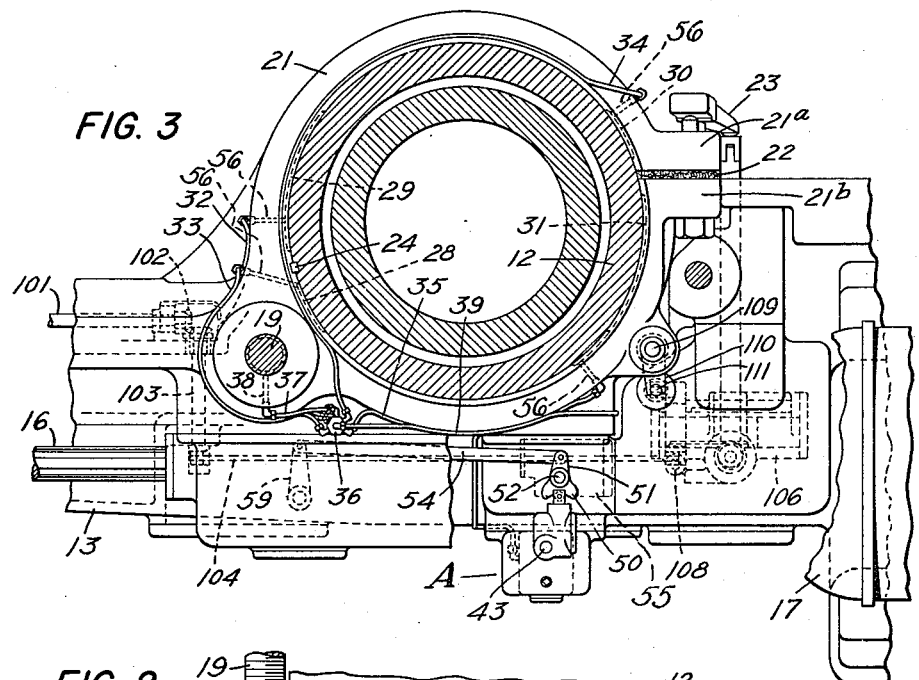
Fig. 3 is a plan view (partly in section) of the mechanism shown in Fig. 2.

The invention is disclosed embodied in a radial drilling machine having a base 10, and an upstanding post 11 upon which is rotatably mounted a sleeve member 12. A radial arm 13 is vertically adjustable upon the sleeve and carries upon its extending portion a laterally adjustable tool head 14. The tool head is provided with the usual rotatable and translatable spindle 15 which is driven through change speed gearing, journaled in the head, from the arm shaft 16. The arm shaft in turn connects directly with the drive motor 17 through the gear 18.

Figure 2:
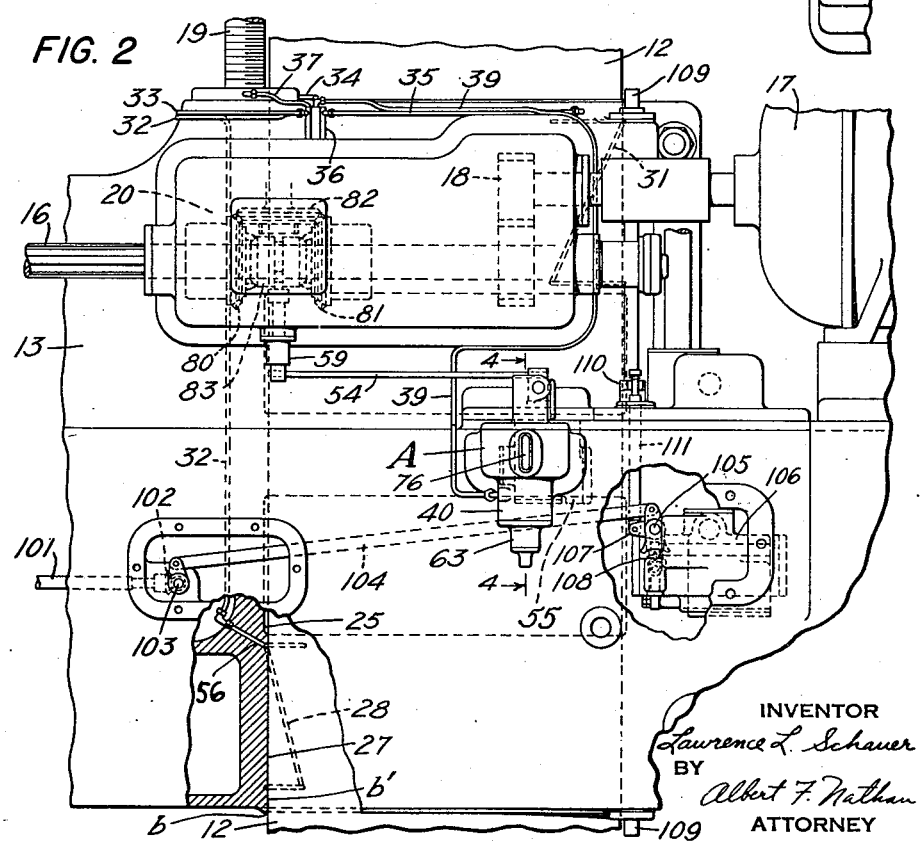
Fig. 2 is an enlarged view of the sleeve girdling portion of the arm.

In locating the tool spindle to the desired position relative to the workpiece, it is frequently necessary to raise or lower the arm 13, and for this purpose elevating mechanism indicated generally at 19 and 20 is provided, the mechanism 20 representing a reversing means illustrated more clearly in Figs. 2 and 6, which is adapted, when actuated to one of its effective positions, to effect elevating or lowering movements of the arm.

The arm 13 has a girdle portion 21 that surrounds the sleeve 12 and is accurately fitted thereto. The girdle portion is split at 22 and the two portions 21ª, 21ᵇ are adapted to be moved toward each other by arm clamping mechanism 23.

Approximately diametrically opposite the split portion 22, is a key 24 secured to the arm girdle which rides in a key-way formed in the surface of the sleeve 12 and prevents relative angular movement between the arm and sleeve during raising, lowering, or clamping operations.

With reference to Fig. 1 it will be observed that because of the lever-like action of the radial arm 13, amplified by the weight of the head 14, the arm tends to bind upon the sleeve in the regions marked a and b. During the raising or lowering movements, when the arm is unclamped from the sleeve, this binding tendency becomes more pronounced. It is therefore, at those regions in particular that lubrication is required, and it is those same regions that are most difficult to maintain lubricated by reason of the tightness of the joint and the tendency of the end portions a' and b' of the girdle to wipe or scrape the surface of the sleeve clean of any lubricating material that may have been applied. Swabbing of the external surface of the sleeve 12 did not solve the problem for the reason that at the first pass of the arm the critical regions of the column are wiped dry.

A primary objective of the present invention is to apply and maintain the above mentioned critical regions of the arm and sleeve adequately lubricated whenever the arm is in motion, without forethought or attention by the operator. With that ultimate objective in view, the interior surface of the arm girdle is cored out intermediate its ends as at 25, leaving an upper and lower portion 26, 27 that are machine finished to provide upper and lower annular bearing surfaces. In these surfaces, Z-shaped grooves 28, 29, 30, 31 are formed, the grooves 28, 29 being at the lower portion of the girdle and at the head side of the sleeve (region b'), and the grooves 30, 31 being at the upper portion of the girdle and diametrically opposite, (region a').

In the present machine the spline 24 and the split 22 in the girdle come within the regions requiring lubrication and divide those areas into two parts, hence a separate groove for each of the divided portions of each region is required. Fig. 9 illustrates diagrammatically a development of the bearing portions and the location of the lubricating grooves of the arm girdle.

Each of the oil grooves 28 to 31, communicates respectively with feed lines 32, 33, 34, and 35 leading to a distributor 36. A line 37 from the distributor also connects with an oil duct 38 leading to the arm elevating screw and nut mechanism. A supply line 39 connects the distributor with a source of lubricant in a manner now to be explained.

Figure 5:
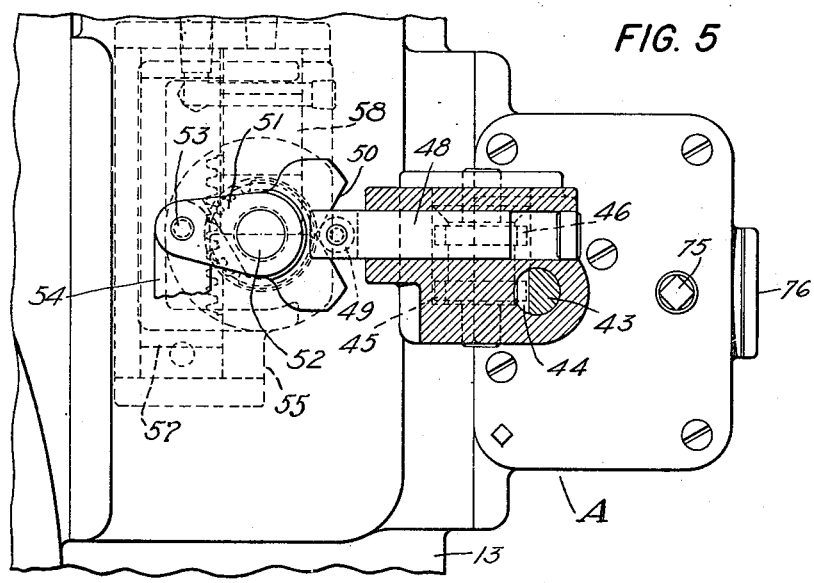
Fig. 5 is a plan view thereof, partly in section.
Figure 4:
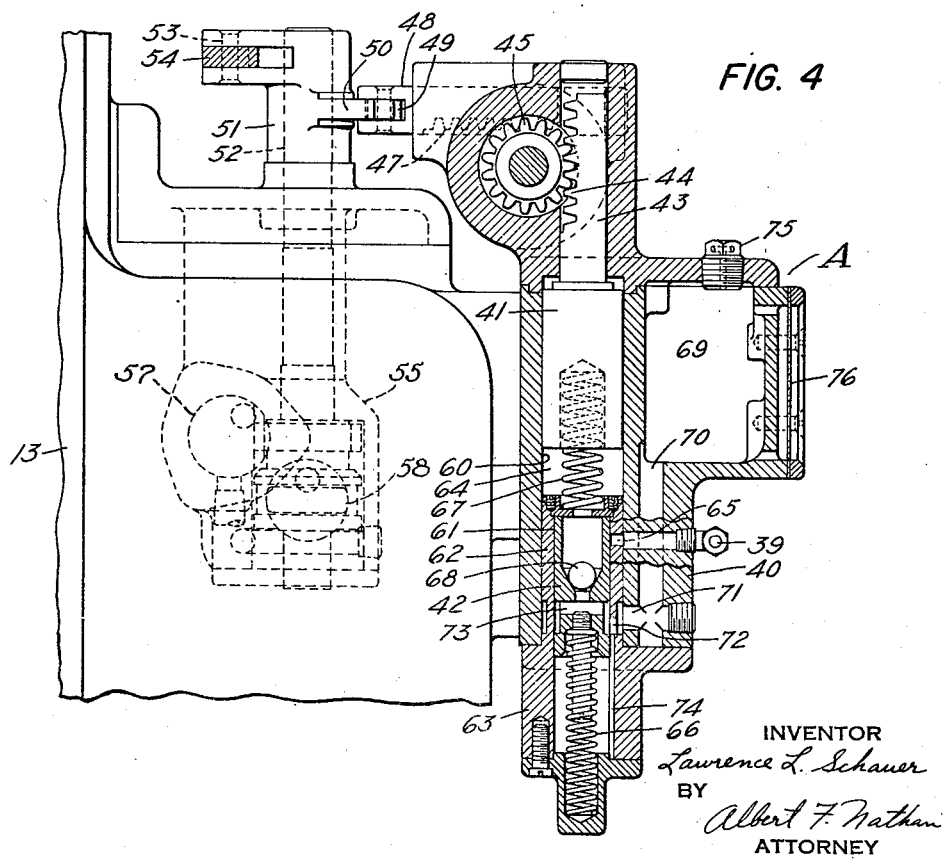
Fig. 4 is a sectional view of the oiling unit on a larger scale.

Referring more particularly to Figs. 2 and 4, a lubricating unit A is mounted to the back of the arm which comprises a casing 40 within which two pistons 41 and 42 are slidably mounted. The upper and larger piston 41 is provided with an extension 43 having rack teeth 44 permanently in mesh with the teeth of a pinion 45. Upon the same shaft as pinion 45, a second pinion 46 is mounted which meshes with rack teeth 47 on a push bar 48. The bar 48 projects from the casing of the oiling unit and carries at its end a roller 49 adapted to engage a symmetrical V-shaped cam surface 50 formed upon a clutch shifting lever 51. The clutch shifting lever pivots at 52 and is provided at a point opposite the cam surfaces 50, with a pivot pin 53 of a two-way acting clutch shifting link 54. The link 54 connects with the elevating clutch shifter 59. Hence, when the elevating clutch 20 is in neutral position, the roller 49 of the oiling unit is at the bottom of the cam surface 50, as illustrated in Figs. 3 and 5 and in this position, the large piston 41 (Fig. 4) is fully retracted.

The large piston 41 operates in a cylinder 60 in the casing and the smaller piston 42 operates in a cylinder 61 formed preferably in a sleeve 62 that fits within the large cylinder 60. As illustrated in Fig. 4, the sleeve 62 may form a continuation of the lower cap 63 of the unit. The end of the large piston 41 is spaced from the end of the cylinder sleeve 62 a distance sufficient to contain a substantial quantity of lubricant and to allow for a full stroke of the piston. Normally the cylinder space 64 is filled with oil and when the large piston 41 moves downwardly the oil in the cylinder 64 between the pistons forms, in effect, an hydraulic connection and forces the small piston 42 downward at a rate faster than the large piston moved by reason of the differential in areas. The extent of movement of the small piston is approximately twice that of the large piston for the same reason. Shortly after the start of the downward movement of the small piston, a lateral port 65 is opened and the column of oil between the pistons is forced into the conduit 39. Assuming that the conduit 39, and those in communication therewith through the distributor 36, are already full of oil, sufficient resistance will be offered to the inflow of additional oil as to cause the small piston to continue moving downward some distance beyond the port 65, in the meanwhile a spring 66 behind the small piston will be compressed.

Downward movement of the large piston occurs rather quickly due to the throwing of the elevating clutch, by operation of the shifting link 54, and in consequence, the pressure between the pistons is that which is caused by the spring 66 and the quantity of oil being shifted bodily from the large cylinder to the small cylinder is the total displacement of the large cylinder minus whatever fraction enters the lubricating conduit 39.

It will be understood, that the shifting of the large cylinder to its maximum downward position occurs coincidentally with the shifting of the elevating clutch to an effective position and the drill arm is in motion, and so long as the drill arm is in motion, the large piston remains in its downward position. Meanwhile, the oil between the two pistons is under the pressure exerted by the spring 66 and is gradually being forced through the port 65 to the various points required, the small piston 42 gradually returning to its initial position.

The various conduits 32, 33, 34, 35, and 37, are constructed so as not to allow the oil between the pistons to be freely discharged therethrough and, therefore, it will take considerable time for the small piston 42 and spring 66 to pump all of the oil through. With that end in view, each of the oil conduits is provided with a wick 56 at its end and once the system is filled with oil the small piston will move only a very small distance during the short time the arm is in motion; and all the while there will be a pressure in all of lubricating lines forcing oil to the surfaces needing the lubrication.

When the elevating clutch is restored to neutral, the large piston is retracted by a spring 67 operating in the cylinder 60 against the end of the cylinder sleeve 62. This movement first relieves the pressure of the oil therein and then tends to produce a negative pressure. If the small piston 42 has, while the arm was in motion, discharged the entire contents of the cylinder into the lubricating lines, the negative pressure created by the return movement of the large piston opens a ball check valve 68 and lets an additional supply of oil in between the cylinders. However, if the small piston has not discharged the full contents into the lubricating conduits, the spring 66 moves the piston toward its initial position as fast as the large piston recedes, and any further movement of the large piston suffices to effect the filling of the chamber as before. When the small piston passes over the port 65, it cuts off the pressure and the supply to the lubricating conduits, consequently, no seepage of oil from the various outlets can occur. Normally, the small piston will close the port 65 only when the elevating clutch is moved to its neutral position and at that time neither the elevating mechanism nor the arm are in motion or in need of lubricating.

To simplify constructional problems, the check valve 68 is formed in the lower piston and communicates with the reservoir 69 through conduits 70, 71, 72, and a cross and an axial conduit 73 in the piston itself. The supply conduit 72 also is in communication with the underside of the piston 42 through the conduit 74. Hence, in the present construction the air and lubricant in the lower portion of the cylinder 61 may flow freely back into the reservoir 69 when the unit is put under pressure, and a simple gravity feed supply through the check valve 68 is effected when the unit is recharged. A vented filling cap 75 is provided in the reservoir to allow for free circulation of the lubricating medium, and a window 76 by means of which the operator may ascertain the level of the oil in the reservoir at any time.

Referring more particularly to Figs. 2, 3, and 6, the control for the oiling unit is disclosed interconnected with the control for the arm elevating clutch mechanism 20. The elevating clutch elements receive power from the arm shaft 16 and comprise two bevel gears 80, 81, normally loose on the arm shaft, and a connecting bevel gear 82. When the shifter 59 is operated to throw the clutch spool 83 in a direction to engage one of the gears 80, 81 with the arm shaft, the gear 82 is caused to be driven in a corresponding direction.

The gear 82 drives a spur gear 84 that meshes with a gear 85 on a stub shaft 86. The gear 85 drives gear 87 which in turn meshes with a gear 88 formed on the external surface of a rotatable elevating nut 89. The elevating nut is held against axial translation relative to the arm, and when it is power rotated, propels the arm up or down along the stationary elevating screw 19. During such operations the entire weight of the arm is carried by the elevating nut and because of this load the nut wears rapidly as compared with the wear upon the threads of the much longer elevating screw. As threads occasionally become stripped a safety nut 90 is provided interlocked with the main nut 89, and which normally is free from load. When and if the threads of the main nut wear to a point of failure, the safety nut 90 comes into action and prevents the arm from falling.

The excessive wear on the main nut is due to its lack of lubrication and by reason of its particular location and function in machines of this character it is difficult, if not impossible, to maintain the parts adequately lubricated. For here, as in the case of the upper and lower opposed regions of the arm girdle, the tremendous pressure between the surfaces of the threads is such as to wipe from the threads, on the first pass of the nut, all of the oil that may have been applied. In consequence, upon the next pass, the screw threads are relatively dry.

With the present invention, however, this cannot occur for the reason that the automatic oiling unit functions to maintain a pressure in conduits 37 and 38 leading to the threads of the elevating screw whenever the arm is in motion the elevating screw mechanism is pressure oiled. As the greatest wear on the elevating nut occurs when the arm is being propelled upwardly, it is preferred to connect the oil ducts 37 and 38 to that region of the elevating screw 19 just in advance of the elevating nut 89 in its direction of travel. By so doing the wear on the threads of the elevating nut is materially reduced and the danger of the stripping of threads practically eliminated.

The control for the elevating clutch mechanism may follow a variety of forms. In my prior Patent No. 2,019,509, one form of elevating control is illustrated in which the elevating clutch shifting fork 59 is actuated hydraulically. To adapt the present automatic lubricator to the construction of the patent, the cam surfaces 50 of the actuator are formed directly upon the hydraulically operated lever 51, and a link 54 transmits the normal motions of the lever 51 to the clutch shifter 59. The lower end of the shaft 52, shown in Figs. 4 and 5, is provided with the hydraulic means 55 whereby it may be oscillated either way from the position shown in Fig. 5, as is more fully explained in my said patent.

For the present purpose it will be believed sufficient to explain that a control lever 52ª mounted on the tool head 14, within convenient reach of the operator, provides the controlling medium for the lubricator as follows: The lever 52ª is constructed with a latch device normally operating to hold the lever in a neutral or an intermediate position. When unlatched the lever may be swung up or down, and in doing so, shifts a link 100 (see Fig. 7) which in turn rocks a splined shaft 101 extending lengthwise the arm. The column end of the shaft 101 is provided with bevel gearing 102, (Figs. 2 and 3) which transmits the oscillatory motion to a cross shaft 103, which in turn, transmits the motion to a link 104 at the back of the arm. The opposite end of the link 104 connects with and oscillates a shaft 105 journaled on the valve box 106 (see Figs. 2 and 8). The shaft 105 oscillates a bell crank lever 107, one arm of which connects with the extending portions of valve plungers 78ª and 79ª and operates the valve plungers in unison. The valve plungers, as explained more fully in my said prior patent, control the flow of hydraulic pressure fluid to the elevating clutch shifting motors 57 and 58 which form part of the mechanism 55. When the head mounted lever is unlatched and swung upwardly, the valve plungers are positioned to effect the hydraulic shifting of the elevating clutch mechanism 20 to a position causing arm elevation, and conversely, and simultaneously therewith the unclamping of the arm.

A spring pressed plunger 108 is provided for holding the linkage mechanism and valves in one of three different positions. Suffice it to say that when the valves are in a position most extended from the casing 106, the arm is unclamped and is moving upwardly. When the valves are in their other extreme position the arm is still unclamped and is moving downwardly, and when the valves are in their intermediate position the arm is stationary and clamped hydraulically to the sleeve.

To prevent bumping at the upper and lower ends of the arm travel, a vertically arranged shaft 109 is mounted for a slight axial movement in the arm girdle and extends from the ends of the girdle a distance sufficient to be engaged by the cap or base of the drill sleeve when and if the arm is translated that far. Engagement of the shaft with the cap or base, shifts the shaft axially, and this movement of the shaft 109 is transmitted through a lateral lever 110 to a secondary rod 111 connected with the other arm of the bell crank lever 107 and automatically shifts the valves and effects restoration of the elevating clutch to a neutral position. Fig. 3 of the drawings shows the location of the piston for actuating the arm clamp mechanism 23 which is also controlled by the valve mechanism 106. These hydraulic mechanisms are interlocked to prevent incompatible operations as set forth in my said patent.

The hydraulically actuated clutch shifter, shown in dotted lines in Fig. 4, operates the shaft 52, the lubricating device actuating cam 50, and the link mechanism 54 as previously explained. With regard, however, to the lubricating device alone, it will be seen that actuation of the control lever at the front of the machine, to an effective position, effects actuation of the lubricating device and puts lubricant under pressure in the respective oil lines. Simultaneously, the actuation of the control lever at the front of the machine causes the arm to be propelled upwardly or downwardly. Thus, there is a concurrence in the operation of the lubricating device with arm movement. Similarly, when the control lever 52ª is manually restored to neutral or when the restoration is effected through the medium of the safety rod 109, the actuating cam 50 is restored to its intermediate position shown in Fig. 5 and pressure on the oil lines is relieved. Simultaneously, the elevating mechanism 20 is put in neutral which stops the motion of the arm. Hence, there is no pressure in the oil conduits and no seepage of oil, and this result follows automatically and irrespective of whether the stopping of the arm motion is effected manually by the operator or automatically.

Another form of actuator and control means for the hydraulic unit is illustrated in Figs. 10 and 11 in which the column clamping and elevating mechanism are in accordance with the structure illustrated in Patent No. 1,708,420 to Klausmeyer. In this construction the plunger actuating cam 50 of the oil unit is formed on the clutch shifter 59ª and the latter connects through link 54ª to an elevating control lever 66ª. The movements of the lever 66ª are controlled and operated from the front of the machine through the manually operable lever 35ª. In this type of clamp construction also, the manual control instrumentality operates both the arm clamping mechanism and the arm elevating clutch mechanism 20, and to prevent inconsistent or incompatible operations the two mechanisms are suitably interlocked, as disclosed more fully in the patent, to prevent arm elevating when the arm is clamped, and conversely, to prevent inadvertent clamping if the arm is in motion.

From the foregoing it is believed apparent that the instant invention lends itself readily adaptable to any machine in which there is a movable member for controlling the starting, stopping, or direction of movement of the relatively shiftable parts constantly requiring lubrication. The present compact and self-contained automatic pressure lubricator requires no external source of supply and may be easily attached to an existing machine by following the principles herein disclosed. When so attached and connected the lubricating unit will automatically supply lubricant under pressure to the several bearing surfaces when and as needed, and relieve and close off the pressure lines upon the stopping of the movement between the parts so served.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In combination with a radial drill having means electively operable to raise or lower the arm on the sleeve, an automatic pressure lubricator for the arm girdle and sleeve bearing portions, comprising a cylinder member; a pair of spaced pistons independently shiftable in said cylinder; spring means normally effective to urge one of said pistons toward the other; a source of lubricating medium and a connection therefrom to the space between said pistons; a non-return valve in said connection; means including a symmetrical cam element operatively connected with one of said pistons and with the electively operable arm raising or lowering means for shifting the said piston in a direction such that the lubricant between the pistons is placed under pressure and said second piston shifted in opposition to said spring means in response thereto whenever the arm raising or lowering means of the machine is rendered effective; a system of oil conduits connected with the girdle portion of the drill arm; and means for establishing communication between said system and the pressure lubricant between said pistons coincidentally with the starting of the arm in motion on the sleeve whereupon said spring pressed piston operates to feed the lubricant to the said bearing surfaces throughout the motion of the arm.

2. An automatic pressure lubricating device for the bearing portions of relatively movable parts of a machine tool combining, power means to effect said relative movement; control means for the power means; an oiler unit comprising a cylinder member; a piston element shiftable in said cylinder; a second piston shiftably mounted in said cylinder spaced from and arranged for movement relative to said first piston; spring means for opposing movement of said second piston; a source of lubricating medium and a connection therefrom to the variable pressure chamber between said piston; a check valve in said connection; means connected with one of said pistons and with the said control means of the machine for shifting the said piston toward the other thereby to place the lubricant in the chamber between the relatively movable pistons under pressure simultaneously with the operation of said power means; a normally closed system of oil lines connected with the portions of the machine to be lubricated; and means automatically operable to establish communication between said system and the chamber between said pistons coincidentally with the actuation of the said control means, said second piston thereupon functioning to feed the lubricant to said system of oil lines.

3. An automatic pressure lubricating means for the bearing portions of relatively movable parts of a machine tool having means for effecting said relative movement and control means therefor, combining a cylinder member; a piston element shiftable in said cylinder; a second piston shiftably mounted in said cylinder spaced from said first piston; lubricating medium in said cylinder between said pistons; spring means normally urging said second piston toward the other; means connected with one of said pistons and with the control for said power means of the machine for actuating the piston a predetermined distance in a direction whereby the lubricant between the pistons is placed under pressure and the other of said pistons hydraulically shifted in opposition to said spring whenever the control means is actuated to effect the relative movement between said parts of the machine; a system of oil lines connected with the portions to be lubricated, said system being normally isolated from said source of lubricating medium; and means including said second piston for establishing communication between said system and the lubricant filled space between said pistons substantially coincidentally with the actuation of the control means, said spring pressed piston thereupon operating to expel lubricant under uniform pressure from the space between the pistons into said oil lines as needed.

4. A lubricating unit for lubricating the arm and sleeve bearing portions of a radial drill, comprising a casing member mounted on the drill arm and providing a cylinder and a lubricant reservoir therein; a piston shiftable in the cylinder; a spring pressed plunger spaced from the head end of said shiftable piston; a conduit connection from said reservoir leading to the chamber between said piston and said plunger; manual means also carried by the arm of the drill for actuating the piston toward the spring pressed plunger whereby the lubricant in the space therebetween is placed under a uniform pressure; and a system of oil conduits connected with the chamber between the piston and said plunger for continuously feeding the lubricant placed under a uniform pressure to the bearing portions of the arm and sleeve of the drill until said manual means is returned to its initial position.

5. A pressure lubricating unit for lubricating the bearing portions of the arm and sleeve of a radial drill, comprising an arm mounted casing member providing a cylinder; a pair of spaced pistons independently shiftable in the cylinder, one of said pistons being spring pressed toward the other; a source of lubricating medium; a system of oil conduits and connections between the said source and the space between said pistons and between said space and the bearing portions to be lubricated; a one-way acting valve in the conduit connection between said source and the space between the piston; manual means mounted on an arm operatively connected with the other of said pistons for actuating same toward the spring pressed piston whereby hydraulically to shift said spring pressed piston and to place lubricant between the pistons under uniform pressure and continuously fed into the oil conduits leading to the bearing portions of the arm and sleeve of the drill until said manual means is operated to restore its piston to its initial position.

6. An automatic lubricator for machine tools comprising a cylinder member; a pair of piston elements shiftable in said cylinder and spaced apart to provide a chamber therebetween; a source of lubricating medium and a connection therefrom to the chamber between said pistons; a non-return valve in said connection; means operatively connected with one of said pistons for shifting the said piston toward the other thereby to place the lubricant in the chamber between the pistons under pressure; resilient means operative on one of said pistons for maintaining said pressure substantially constant; a normally closed oil conduit for conveying lubricant to selected regions of the machine tool; and valve means formed in part by one of said pistons and in part by the cylinder wall for establishing communication between said oil conduit and the lubricant chamber between the pistons coincidentally with the shifting movements of said pistons, said resilient means thereupon operating to shift one of the said pistons toward the other in feeding lubricant from the chamber to the conduit and maintaining the pressure thereof at said substantially constant value.

7. A pressure lubricator for lubricating the bearing portions of relatively movable parts of a machine tool, comprising a casing member having a cylinder and a lubricant reservoir formed therein; a piston shiftable in the cylinder; an independently shiftable spring pressed plunger in said cylinder spaced from the head end of said shiftable piston to form a chamber therebetween; a fluid conduit from said reservoir leading through said plunger to the chamber between said piston and said plunger; a non-return valve means located in said plunger in the fluid conduit therein; manual means for actuating the piston toward the plunger whereby the said non-return valve closes the conduit against regress of fluid to the reservoir and the lubricant in the chamber is placed under uniform pressure; a separate oil conduit connected with the chamber for conveying the lubricant so placed under uniform pressure to the bearing portions of the arm and sleeve of the drill; and means formed in part by said plunger for closing off said separate conduit from the chamber when said piston is returned to its initial position.

8. A pressure lubricating unit for applying lubricant to the bearing surfaces of a machine tool, comprising a casing member providing a cylinder; a large piston and a small piston shiftably mounted in the cylinder, said pistons being normally spaced apart a preselected distance; said spacing affording a chamber adapted to hold a quantity of lubricating medium; spring means normally operative to maintain said small piston in a predetermined position; manually operable means connected with the said large piston for actuating the said piston toward the other whereby the said other is caused to recede rapidly in opposition to the spring and the lubricant in the chamber between the pistons is placed under a uniform pressure; and an oil conduit in said cylinder for conveying the lubricant under pressure to the bearing surfaces, said oil conduit being normally closed by the small piston and constructed and arranged to be uncovered by the said shifting movement of the small piston, said spring means thereafter operating to move the small piston and thereby feed lubricating material to said bearing surfaces.

9. A pressure lubricating unit comprising a casing member providing a cylinder; piston element shiftable in the cylinder; spring means normally urging said piston to a retracted position; manually operable means for shifting the piston in opposition to said spring; a second piston independently shiftable in said cylinder; spring means normally urging said second piston to a retracted position, said pistons being spaced apart to form an oil chamber therebetween; means for filling said chamber with oil whereupon said second piston is shifted hydraulically in response to the shifting of said first piston; valve means actuated by the shifting of said second piston for controlling the escape of the lubricant under pressure from between the pistons in response to the action of said second spring means; and a system of oil conduits connected with the said valve means for conveying the lubricant under pressure to selected locations.

10. A lubricating device adapted to feed lubricant to the wicks of bearings of a machine tool, combining a casing member provided with a pair of telescoping cylinder members of different diameters, an apertured partition wall between adjacent ends of said cylinder members, a first piston member shiftable in the larger of said cylinders and adapted to be connected with an infrequently moved control element of the machine and to be actuated thereby; spring means between the end of said piston and said partition wall normally effective to retract the piston thereby to provide an oil chamber at the head end of the large cylinder; a second piston member slidably fitted in the smaller of said cylinders, spring means normally effective to maintain the head end of the piston against said apertured partition wall, said smaller piston receding against its spring upon manual movement of the large piston toward the said wall to effect substantially the complete transfer of the oil from the large cylinder to the small cylinder; means automatically locking the large piston in said last named position; valve means including a port automatically opened at the beginning of the receding movement of the small piston for controlling the escape of oil from the small cylinder, the said smaller piston thereafter functioning as the sole means for feeding the transferred oil through said valve port to the wicks at the point of application; and means for filling the chamber in the large cylinder and simultaneously extracting the oil from the small cylinder concurrently with the returning movement of the large piston to its normal position.

11. An oil feeding device for a wick oiling system of a machine tool combining a casing member provided with a pair of axially aligned cylinders of different diameters, an apertured partition wall between adjacent ends of said cylinders, a first piston member in the larger of said cylinders and adapted to be interconnected with a manual control of the machine so as to be actuated concurrently therewith, said piston normally occupying a position in the cylinder spaced from said partition wall thereby to provide an oil chamber in the head end of the large cylinder; a second piston member slidably fitted in the smaller of said cylinders, spring means normally effective to maintain the head end of the smaller piston against said apertured partition wall, said smaller piston receding against its spring upon movement of the large piston toward the said wall in effecting transfer of the oil from the large cylinder to the small cylinder; means for locking the large piston in said last named position upon actuation of the manual control; and a wicked conduit communicating with the small cylinder including a port automatically opened at the beginning of the receding movement of the small piston for conducting oil from the small cylinder, said smaller piston functioning independently of the large piston as the sole means for urging the transferred oil through said port to the oiling wicks of the system.

12. An oil feed device for wick oiling systems combining a casing member provided with a pair of axially aligned cylinders of different diameters, an apertured partition wall between adjacent ends of said cylinders, a manually shiftable first piston member in the larger of said cylinders normally maintained in a retracted position spaced from said partition wall thereby to provide an oil chamber at the head end of the large cylinder; a second piston member having an effective stroke approximately twice the stroke of the large piston slidably fitted in the smaller of said cylinders, spring means normally effective to maintain the head end of the small piston against said apertured partition wall, said smaller piston receding against its spring substantially its full stroke upon movement of the large piston toward the said wall in transferring the oil in the chamber of the large cylinder to the small cylinder; means for locking the large piston in said last named position; and a wicked conduit communicating with the small cylinder including a port automatically opened by the small piston and at the beginning of the receding movement thereof for conducting the transferred oil out of the small cylinder, said smaller piston in response to the compression of its spring serving as the sole means for urging the transferred oil through said port to the wicks at the points of application.

13. An oil feeding device for a wicked oil line combining a casing member provided with a pair of axially aligned cylinders of different diameters, an apertured partition wall between adjacent ends of said cylinders, a first piston member in the larger of said cylinders normally maintained in spaced relation with said partition wall thereby to provide an oil chamber at the head end of the large cylinder; a second piston member slidably fitted in the smaller of said cylinders, resilient means operative upon the small piston to maintain the head end of the piston against said apertured partition wall and yielding responsive to the hydraulic shifting of the small piston upon movement of the large piston toward the said wall in effecting a transfer of the oil from the large cylinder to the small cylinder; means for shifting said first piston to effect said transfer of the oil to the small cylinder including a device for locking the large piston in said shifted position; and valve means including a port connected with the wicked oil line automatically actuated to an open position at the beginning of the receding movement of the small piston for conducting the transferred oil out of the small cylinder, said resilient means subsequently operating gradually to return the small piston to its initial position at a rate dependent upon the rate of oil consumption of the wick at the point of application.

LAWRENCE LEE SCHAUER.